(12) United States Patent
Brown

(10) Patent No.: US 7,389,722 B2
(45) Date of Patent: Jun. 24, 2008

(54) GAS FLUSH MIXING SYSTEM AND METHOD

(75) Inventor: Richard S. Brown, Chualar, CA (US)

(73) Assignee: Fresh Express Incorporated, Salinas, CA (US)

( * ) Notice: Subject to any disclaimer, the term of this patent is extended or adjusted under 35 U.S.C. 154(b) by 463 days.

(21) Appl. No.: 10/874,693

(22) Filed: Jun. 22, 2004

(65) Prior Publication Data

US 2005/0279404 A1    Dec. 22, 2005

(51) Int. Cl.
*A23B 7/148* (2006.01)
*A23B 7/152* (2006.01)

(52) U.S. Cl. ............................ 99/468; 99/472; 99/475; 99/473

(58) Field of Classification Search ................ 99/467, 99/468, 472, 473, 474, 475; 422/33, 287, 422/288, 295, 305, 307
See application file for complete search history.

(56) References Cited

U.S. PATENT DOCUMENTS

| | | | |
|---|---|---|---|
| 4,894,997 A * | 1/1990 | Urushizaki et al. ............. 62/78 |
| 5,163,360 A | 11/1992 | Petz | |
| 5,390,666 A | 2/1995 | Kimm et al. | |
| 5,470,390 A | 11/1995 | Nishikawa et al. | |
| 5,623,105 A * | 4/1997 | Liston et al. ............. 73/863.81 |
| 5,702,669 A | 12/1997 | Green | |
| 5,791,236 A | 8/1998 | Schouten | |
| 6,460,352 B1 | 10/2002 | Lemcoff et al. | |
| 2003/0101875 A1 * | 6/2003 | Ono ............................. 99/339 |

* cited by examiner

*Primary Examiner*—Reginald L Alexander
(74) *Attorney, Agent, or Firm*—Townsend and Townsend and Crew LLP

(57) ABSTRACT

A gas mixing system and method designed to flush produce with a gas-air mixture of desired oxygen concentration to preserve the produce. The produce is placed in a vacuum vessel, which is then evacuated to a desired degree. Atmospheric air is provided to the vacuum vessel via an air valve, and nitrogen gas is provided to the vacuum vessel via a gas valve. A valve controller operates in a first mode wherein the air valve is a fully open master valve and the gas valve is a partially or fully open slave valve, and operates in a second mode wherein the gas valve is a fully open master valve and the air valve is a partially or fully open slave valve. The system automatically switches between the two modes to accommodate changing conditions, to maintain the desired oxygen concentration in the gas-air mixture. Multiple modes are possible with greater numbers of valves.

15 Claims, 4 Drawing Sheets

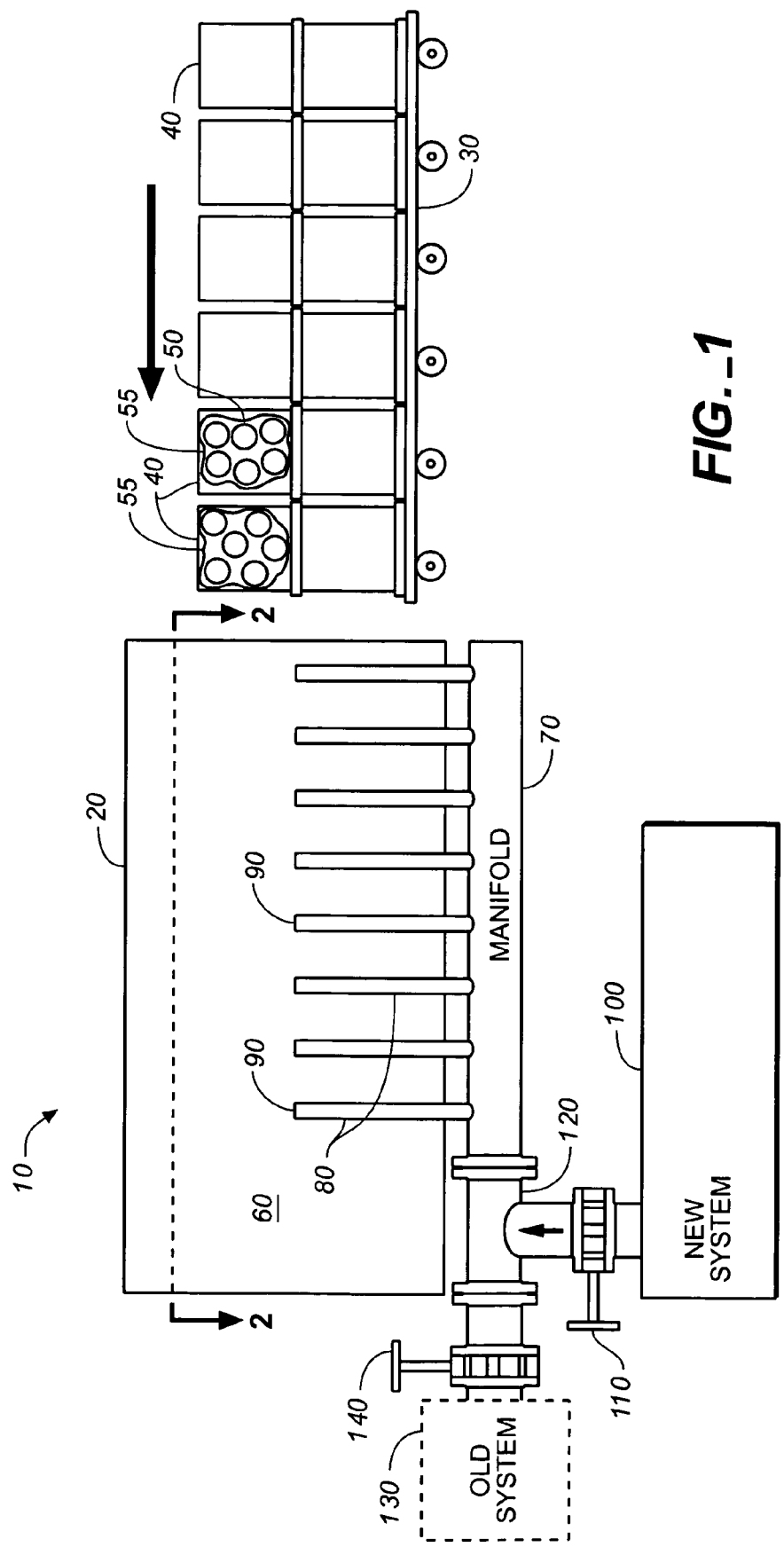
FIG._1

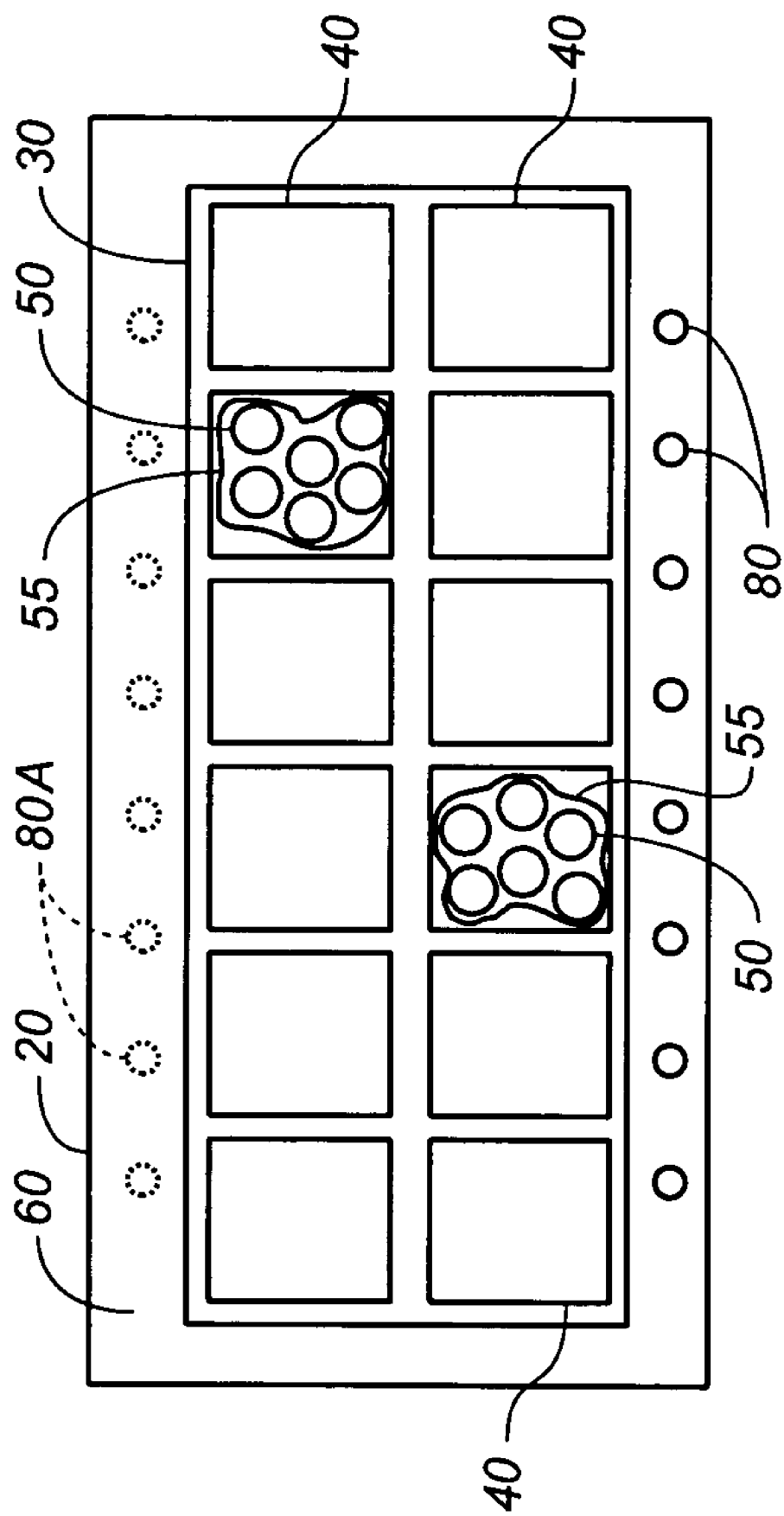
FIG._2

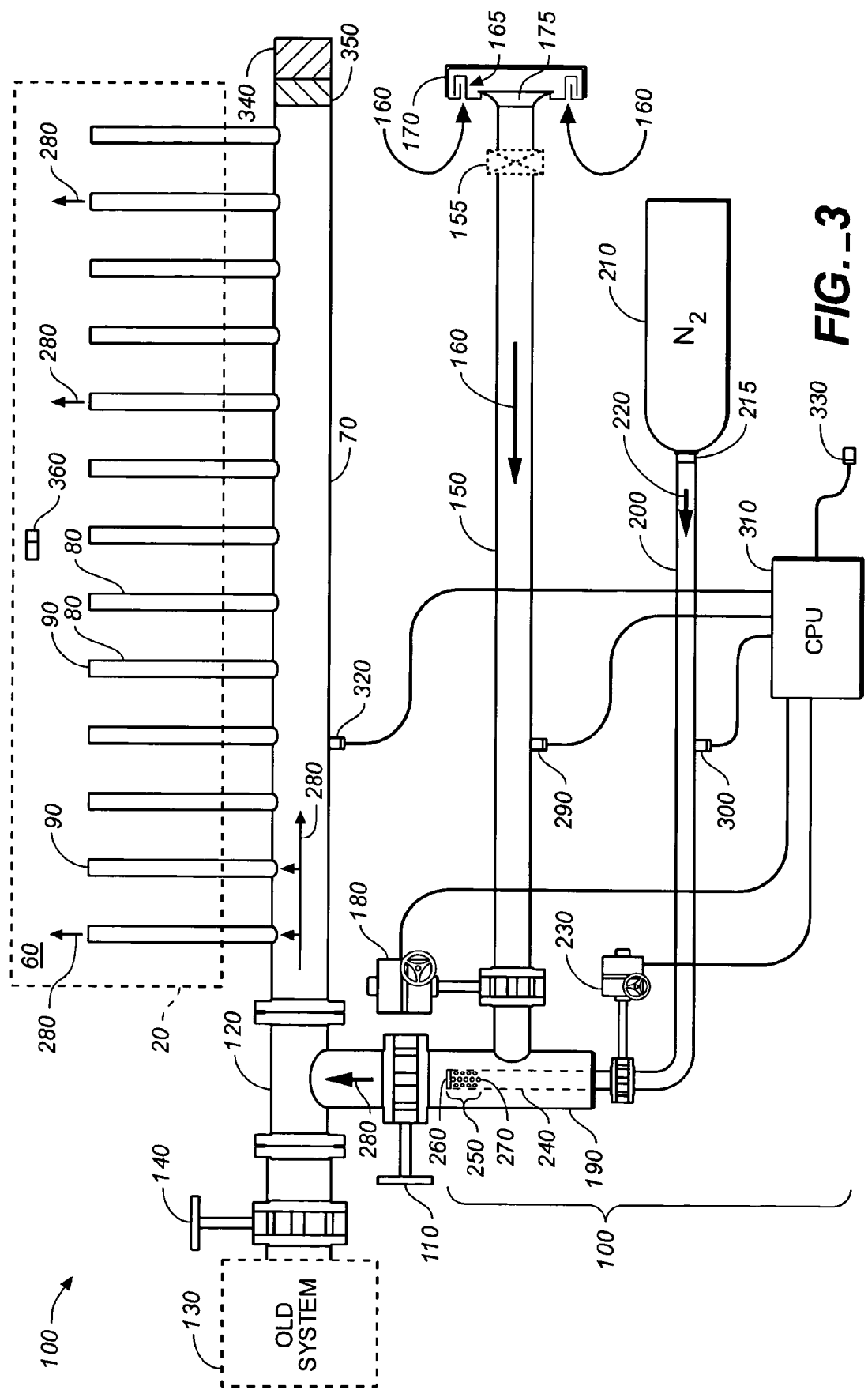
FIG._3

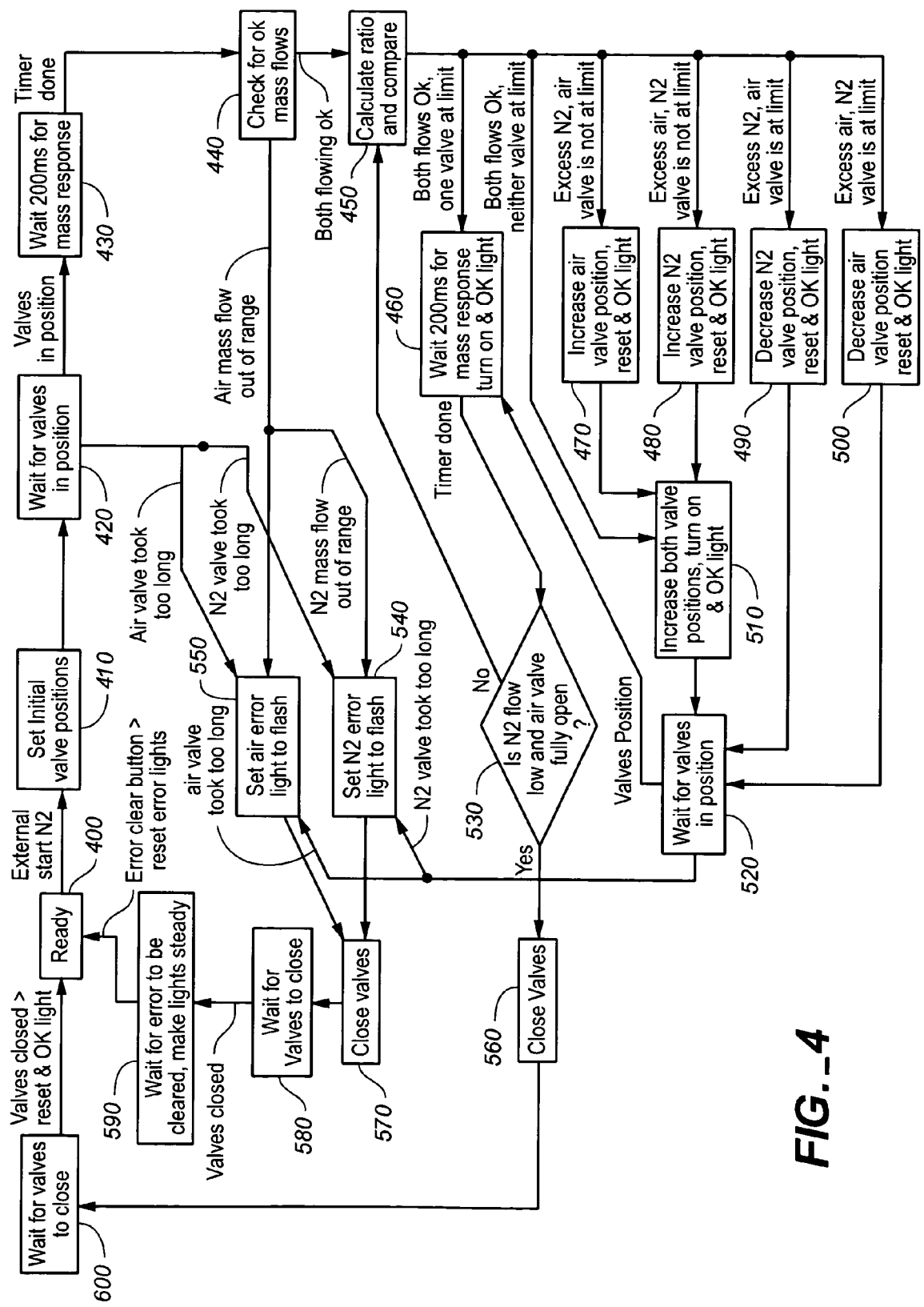
FIG._4

GAS FLUSH MIXING SYSTEM AND METHOD

BACKGROUND OF THE INVENTION

The present invention relates to a system and method for blending gases in mixtures suitable for a variety of applications, such as for flushing vacuum vessels in which produce is stored to preserve the produce and inhibit adverse effects on the produce due to exposure to either too much or too little oxygen.

In some current systems for preserving produce, the produce is placed inside a plastic storage bag, from which the air is evacuated, and a gaseous mixture (typically containing less oxygen than atmospheric air) is introduced. The produce can be better preserved in this manner, both to prevent oxidation due to a high-oxygen environment—atmospheric oxygen being at a level of about 21%—and to prevent damage caused by an anaerobic environment.

With such a system, the gaseous mixture can be premixed, such that an accurate blend with a desired proportion of oxygen is achieved. However, a disadvantage arises from the fact that the flexible produce bags collapse upon evacuation, resulting in stress on and damage to the produce.

In other systems presently in use, produce may be placed in a rigid vacuum vessel and a gaseous mixture of appropriate oxygen content is introduced into the vacuum vessel. This may be accomplished, for instance, by first at least partially evacuating the vacuum vessel, then mixing some inert gas such as nitrogen from a pressurized nitrogen source with atmospheric air by the use of adjustable valves leading to a mixing chamber, and finally allowing the mixture to flow into the vacuum vessel. One problem with such a system is that, as the gas pressure within the vacuum vessel approaches atmospheric pressure, the nitrogen-air ratio may vary from that needed to achieve the desired resultant oxygen content in the mixture that reaches the vacuum vessel.

A system is accordingly needed wherein produce may be preserved by a gaseous mixture having a desired oxygen content, without physical damage to the produce and allowing real-time mixture of the introduced gases in the desired ratios.

SUMMARY OF THE INVENTION

In a gas-air mixing/produce flushing system and method of the invention, the produce is loaded into rigid bins, which are placed within a vacuum vessel. The vacuum vessel is then sealed and evacuated of air. A mixture of nitrogen and atmospheric air with a desired concentration of oxygen is then flowed into the vacuum vessel until it reaches atmospheric pressure, providing an environment in which the produce will be preserved longer than if it were left in atmospheric air. Liner bags within the bins are automatically sealed around the produce, the vacuum vessel is reopened, and the bags of produce are removed for distribution.

The nitrogen is provided to the vacuum vessel via a gas valve, and the atmospheric air is provided to the vacuum vessel via an air valve. A valve controller, such as a programmable logic controller, controls the operation of these valves. In a first mode of operation, the air valve is a fully open master valve and the gas valve is a partially or fully open slave valve. If necessary to achieve the desired oxygen concentration, a second mode of operation may be entered, wherein the gas valve is a fully open master valve and the air valve is a partially or fully open slave valve. The system detects the ratio of flow rates through the two valves by the use of mass flow meters, and adjusts the two valves as needed, thereby automatically switching between the two modes of operation to maintain the desired oxygen concentration in the gas-air mixture.

The invention is particularly suitable for leafy vegetables that are cored and trimmed in the field during harvest, such that only the usable portions of the head and leaves are transported from the field. In this setting, the produce is more likely to undergo an enzymatic (oxidative) browning reaction from polyphenol oxidase, and accordingly the produce is packaged in a modified, reduced-oxygen atmosphere, while avoiding physical damage as in prior systems.

The configuration of the control system is applicable to other purposes than produce preservation, including electrical applications, and may include more than two controlled valves, in which case multiple modes of operation may be used.

BRIEF DESCRIPTION OF THE DRAWINGS

FIG. 1 is a diagram of a system incorporating features of the present invention.

FIG. 2 is a top view of a produce vacuum vessel suitable for use in the present invention.

FIG. 3 is a diagram of a gas mixing system of the invention.

FIG. 4 is a flow chart illustrating a method of mixing gases for produce preservation according to the invention.

DETAILED DESCRIPTION OF THE INVENTION

FIG. 1 illustrates a produce storage system 10 including a vacuum vessel 20 in which bins may be placed, such as by driving a truck 30 loaded with bins 40 containing produce 50 into the vacuum vessel 20. In a farming environment, for example, the vacuum vessel 20 may have approximately the dimensions of a tractor-trailer, e.g. forty-five feet long by ten feet wide by ten feet high. FIG. 2 shows a sectional view of the vacuum vessel 20 taken along line 2-2 in FIG. 1, showing in this example a 10-by-45 foot produce compartment 60 within the vacuum vessel 20.

The produce 40 may be lettuce, cabbage, or any product that may be preserved—or in which undesired effects may be inhibited—by placing it in a suitable gaseous environment. In the example shown in FIGS. 1 and 2, twenty-four bins 40 are used, though in other embodiments different numbers of bins may be used, such as forty-eight bins, or some other number.

The produce 50 may be enclosed by individual sealable bags 55 which are evacuated and flushed with the appropriate gas-air mixture along with the produce compartment 60, in a manner described below. An appropriate temperature for the produce may be about 33° F. (about 0.5° C.), and an appropriate pressure may be about 4.7 mm Hg absolute pressure.

In FIG. 1, a manifold 70 includes pipes 80, which include openings 90 from which a gaseous mixture of desired oxygen content flows into the compartment 60. Additional pipes 80A (see FIG. 2), similar to pipes 80, may be coupled to the manifold 70 if desired, to achieve a faster and/or more evenly distributed introduction of the gaseous mixture into the compartment 60.

As shown in FIGS. 1 and 3, a gas mixing system 100 of the invention may be coupled via a gate valve 110 (or some other valve or coupling) to a T-fitting 120 or other coupling to the manifold 70. In this embodiment, a prior system 130 may likewise be coupled via a gate valve 140 to the T-fitting 120. This particular configuration is useful when installing the new system 100 for testing and ultimately to replace the old system 130, which may be removed or left in place as a backup system as desired. When the new system 100 is in operation, typically the gate valve 140 will be in a closed position.

The valves 110 and 140 may be hand operated or under automatic control. For instance, whenever the mixing system 100 is operational, the valves 110 and 140 may be driven by the mixing system to their open and closed positions, respectively (though, as described below, valve 110 will be either opened or closed depending upon the stage of the flushing procedure).

MIXING SYSTEM EQUIPMENT OF ONE EMBODIMENT OF THE INVENTION

FIG. 3 illustrates in detail an embodiment of the gas mixing system 100. An intake pipe 150 is positioned to receive atmospheric air 160 through a muffler 170 (i.e. baffles or some other noise-reducing apparatus), which helps minimize noise due to the rushing of air 160 into the pipe 150. The muffler 170 or other portion of the inlet to the pipe 150 may include a cooled or refrigerated section 165, which cools the incoming air to condense out moisture, which otherwise can lower the accuracy of the flow readings.

A flared region 175 is provided the inlet opening of the pipe 150, and is configured to direct incoming air 160 into a nonturbulent (or less turbulent) flow in the pipe 150. A butterfly valve 180 (or other suitable valve) is positioned on the pipe 150.

If the pressure within the compartment 60 is lower than atmospheric pressure (about 760 mm Hg) and valves 110 and 180 are open, air 160 is caused to flow into the pipe 150, through the valve 180, into a mixing chamber 190 coupled to the pipe 150, through the T-fitting 120, through the manifold 70 and the pipes 80, and into the compartment 60 via the openings 90.

Another intake pipe 200 is coupled to a pressurized source 210 of nitrogen 220, and is connected to the mixing chamber 190 via a butterfly valve 230 (or other suitable valve) and a mixing manifold 240. In place of nitrogen, it is possible to use any gas or mixture of gases that is inert or relatively nonreactive with the produce or that includes a component that contributes to the preservation of the produce.

A check valve 155 may optionally be positioned near the inlet end of the pipe 150 as shown, to prevent nitrogen 200 from escaping to atmosphere in case of a failure of the system to shut the valves 180 and 230 once the compartment 60 reaches atmospheric pressure.

The desired gas-air mixture will depend upon the produce or other product to be preserved or stored, and in the case of lettuce the mixture may be selected such that the resulting oxygen content of the mixture is no more than about 10%, and in particular a 7 to 9% content may be selected. In general, depending upon the produce to be packaged, the desired final oxygen ($O_2$) concentration may be less than 2% or greater than 14%. A target content of N % will result in a range of oxygen concentrations in the bins 40 that are close to but not necessarily exactly N %, due e.g. to oxygen absorption by the produce and other materials.

Other oxygen concentrations are possible, depending upon the product, the length of time of storage (e.g. for short storage periods a higher oxygen content—or greater range of concentrations—may be tolerated), etc. The resulting range of oxygen concentrations will have a lower limit and an upper limit. The upper limit is selected to inhibit undesired oxidation, while the lower limit is selected to inhibit undesired anaerobic effects. Thus, a larger range—with a lower low limit and/or a higher high limit—may be allowed for shorter storage periods, storage at lower temperatures, lower humidity, etc. The oxygen content range may be automatically adjusted for temperature, humidity, expected length of storage and other factors via the valve controller 210.

The nitrogen source 210 may be a tank of liquid nitrogen, in which case a heat exchanger 215 may be provided to warm the nitrogen above its boiling point so that it is provided at the mixing chamber 190 in gaseous form, and optionally heated to some predetermined temperature to avoid freezing of (or causing undesired condensation on) either the components of the mixing system or the produce.

The mixing manifold 240 may be formed as a generally cylindrical pipe coupled to the intake pipe 200 via the valve 230, and having a turbulent flow generator 250 configured to induce turbulence in the flow of nitrogen. In the embodiment illustrated in FIG. 3, the turbulent flow generator 250 includes an end cap 260 configured to block the passage of nitrogen and a plurality of apertures 270 disposed along a wall or walls of the mixing manifold 240, which permit the passage of nitrogen into the mixing chamber 190. The turbulence induced by the passage through the apertures 270 causes the nitrogen to mix with air 160 entering the mixing chamber 190, and the resultant gas-air mixture 280 is drawn by the lower downstream pressure via the manifold 70 and the pipes 90 into the compartment 60.

The diameters of the pipes 70, 150 and 200, the T-fitting 120 and the mixing chamber 190 are selected based upon the particular application desired. In the exemplary embodiment of FIG. 3, in which pressurized nitrogen is mixed with air to achieve a gas-air mixture of approximately half or less than the oxygen content of atmospheric air, it may be suitable to use a 2.25-inch (about 6 cm) pipe 200 and a 5-inch (about 13 cm) pipe 150, and to select 8 inches (about 20 cm) as the diameter of the mixing chamber 190, the T-fitting 120 and the pipe 70. The flow of air 160 in this example is induced by a pressure differential that in general will be less than pressure differential inducing the flow of the nitrogen 220, and thus a larger pipe may be used to reduce flow resistance. The combined flow of the gas-air mixture 280 is accommodated by yet larger-diameter components.

The intake pipe 150 is provided with a mass flow detector or other flow sensor 290, and the intake pipe 200 is provided with a mass flow detector or other flow sensor 300. Suitable flow sensors for use with the present invention include, for example, mass flow meters available from Sierra Instruments, Inc. of Monterey, Calif. (see http://www.sierrainstruments.com). The flow sensors 290 and 300 are configured to detect the flow rates of air and nitrogen, respectively, in the pipes 150 and 200, to generate signals representing these flow rates, and to transmit these signals to a valve controller (or control logic) 310. The valve controller communicates with the valves 180 and 230, and adjusts these valves to achieve a predetermined gas-air ratio in a manner described below.

The valve controller 310 may take the form of hardware, software, firmware, or any suitable combination thereof, and may include a combination of a processor-based system, ASICs (application-specific integrated circuits), FPGAs (field-programmable gate arrays), software modules, circuitry and the like. In general, the terms "logic", "module", "controller" and the like are used herein to refer to any such variations in particular implementations of the invention. In one embodiment, the controller 310 may include a programmable logic controller (PLC) such as an Allen-Bradley PLC available from Rockwell Automation of Milwaukee, Wis. (see http://www.ab.com/plclogic).

The connections between the flow sensors 290-300 and the controller 310, and between the controller 310 and the valves 180 and 230, may be wired or wireless connections or some combination thereof as suitable for the particular implementation.

The sensors 290 and 300 in the embodiment of FIG. 3 are mounted at locations at which a substantially laminar or in general nonturbulent flow of gas or air, respectively, is likely to occur, in particular far enough downstream of the intakes of the pipes 150 and 200 such that turbulence in the air or gas flow has reduced to a point at which the flow sensors can generate flow rate signals with a desired level of accuracy. While there may still be some turbulence as the air 160 passes the flared region 175, the length of the pipe 150 between the flared region 175 and the sensor 290 is selected to allow turbulence to diminish to a degree such that a substantially accurate flow reading is obtained. The length of the pipe 200 between the nitrogen source 210 and the flow sensor 300 is similarly selected to minimize turbulence to the desired degree. The accuracy of the flow readings is further assisted by placing the flow sensors 290 and 300 far enough upstream of the valves 180 and 230—and any other discontinuity in the pipes, such as bends, changes in diameter, couplings, and so on—to reduce or minimize any effects of backpressure (e.g. added turbulence or flow resistance) in the air or gas flow due to such discontinuities.

For instance, the air pipe 150 may have a length of approximately 100 inches (about 2.5 meters) between the inlet at the flare 175 and the sensor 290, and a length of approximately 36 inches (or roughly 1 meter) between the sensor 290 and the valve 180. The nitrogen pipe 200 may have a length of about 50 inches (about 1.25 meters) between the source 210 and the sensor 300, and a length of about 50 inches between the sensor 300 and the valve 230. Other lengths may be appropriate for different applications, and may be calculated or empirically determined using flow tests to gauge the accuracy of flow readings for a given arrangement.

Modes of Operation of the Mixing System

The controller 310 is programmed or otherwise configured to control the valves 180 and 230 in at least two modes. In a first mode, the air valve 180 acts as a master valve and the gas valve 230 acts as a slave valve, while in a second mode the gas valve 230 acts as a master valve and the air valve 180 acts as a slave valve. Thus, in the first mode the air valve 180 is maintained in some position, e.g. a substantially open position or some other position, while the gas valve 230 is adjusted to achieve the desired gas-air ratio.

When produce is initially loaded into the compartment 60, as in FIG. 2, the compartment 60 is sealed and evacuated to some desired pressure less than atmospheric pressure. This may be accomplished by closing valves 140 and 110, either manually or under automatic operation, and using a pump 340 to evacuate the compartment 60 to a desired low pressure. The pump may then be switched off, or may be left running; in either case, a butterfly valve 350 is closed once the desired pressure inside the compartment 60 is achieved.

The valves 180 and 220 are normally kept closed (when the gas flush operation is not under way). The valve controller 310 commences operation by opening the valves 180 and 220 to degrees sufficient to achieve a desired gas-air mixture.

Since the air 160 provided via the pipe 150 is substantially at atmospheric pressure, the initial evacuation of the compartment 60 will cause air to be drawn into through the mixing chamber 190 and ultimately into the compartment 60. With a sufficiently high flow of air 160 and a simultaneous flow of pressurized (i.e. higher than atmospheric pressure) nitrogen 220 via pipe 200, typically at the beginning of operation the gas valve 230 will allow sufficient nitrogen to flow past at fully open or partially closed positions to achieve the desired gas-air mixture, even though the air valve 180 may be fully open. The controller 310 is accordingly operated to provide a nitrogen-air mixture to achieve the desired level of oxygen concentration by adjusting the gas valve 230 while the air valve 180 is fully open. This may be referred to as the first mode of operation.

The system may be configured to commence operation with this first mode of operation. If the desired mixture can be achieved when the air valve 180 is its wide-open position, then the first mode of operation is maintained. However, if the gas valve 230 is opened fully and the amount of nitrogen supplied relative to the amount of atmospheric air is still insufficient to achieve the desired oxygen concentration, then it is necessary to at least partially shut down the air valve 180 to reduce the amount of oxygen reaching the mixing chamber 190. The controller 310 thus enters the second mode of operation, wherein the gas valve 230 is the master valve and the air valve 180 is the slave valve. In this example, the gas valve 230 will be maintained in a fully open position while the air valve 180 will be controlled to achieve the desired mixture.

In another embodiment, the system may be configured to automatically determine which mode of operation to commence operation with by slowly opening both the gas valve and the air valve, and monitoring the flow sensors to maintain the desired mixture. Whichever valve is fully open first becomes the master valve.

As the nitrogen-air mixture is provided to the compartment 60, the pressure within the chamber will rise, resulting in a lower pressure differential between the atmospheric air and the compartment 60, resulting in lower flow rates for the air 160. Under these conditions, the first mode of operation may be the appropriate mode, with the air valve 180 at a fully or other wide-open position and the gas valve 230 being shut to a point sufficient to achieve the desired oxygen concentration.

Similarly, as the pressure within the nitrogen tank 210 diminishes over time (as the supply of nitrogen is reduced), the pressure differential between the nitrogen source and the compartment 60 will be relatively lower, and the system may eventually need to enter into the second mode. In this example, the gas valve 230 may be opened to a fully or other wide-open position while the air valve 180 is adjusted to partially closed position to achieve the desired gas-air mixture.

If the system is in the first mode of operation, and the air valve 180 is fully open while the gas valve 230 is partially open, conditions (due to the above-mentioned pressure differentials) may be such that, even though the valve controller 310 has adjusted the gas valve 230 to its fully opened position, there is still insufficient nitrogen in the resultant mixture 280 to achieve the desired oxygen concentration. The valve controller 310 will detect this condition, and once the gas valve 230 is in the fully opened position it will be maintained in that position and the controller will then adjust the air valve 180 to a partially closed position until the desired mixture is achieved. Thus, the system automatically and dynamically switches from the first mode to the second mode (or vice-versa) as needed to achieve the proper mixture.

As the pressure within the compartment 60 approaches atmospheric pressure, the air flow past sensor 290 will diminish to zero (since there will no longer be a pressure differential to drive the air flow), and the valve controller will detect this condition and ultimately shut the gas valve 230 completely. The system is configured also to close down valve 180 at this point.

A pressure transducer or other pressure sensor 320 may be provided at the manifold 70 or otherwise in communication with some portion of the flow path for the mixture 280 (including in the compartment 60), and transmits pressure readings either by a cable or wirelessly to the controller 310. The controller 310 is thus configured to close the air valve 180 and the gas valve 230 completely once it is detected that the pressure in the mixture flow path has reached atmospheric pressure. A value for atmospheric pressure may either be programmed into to the controller in advance, or—since atmospheric pressure is not constant—a pressure sensor 330 may be provided to provide a reading of atmospheric pressure. When the signals from the sensors 320 and 330 indicate within some predetermined range that the compartment 60 pressure is substantially equal to the atmospheric pressure, the valves 180 and 230 are closed.

An oxygen sensor 360 may be coupled to the compartment 60, and configured to generate signals relating to the amount of oxygen in the gas-air mixture within the compartment. These signals may be transmitted by network cables, wireless network or the like to a user's computer system or display (not separately shown), and/or may be provided as a feedback signal to the controller 310 and used to adjust the valves 180 and 230. If such a feedback signal is used, the controller may be configured to allow it to supersede the flow signals from flow sensors 290 and 300, or to use it in conjunction with those flow signals to achieve a more accurate oxygen concentration in the compartment 60.

Oxygen concentration readings may also be taken of the liner bags 55 by, for example, providing valved ports or septa (not separately shown) on the sealed bags that allow a user to take readings of the bags one at a time. Once the gas-air flush operation has been completed and the compartment 60 has reached atmospheric pressure, the bags are all automatically sealed while the compartment is closed. The compartment is then reopened, thus allowing removal of the bins and access to the individual liner bags 55 by a worker, who can test them for proper oxygen concentration. Due to differences in physical configuration and total content of the bags, typically a range of oxygen concentrations will be achieved, e.g. in the 7 to 9% range.

Apparatus and methods that may suitably be combined with the teachings of the present invention are disclosed in applicant's U.S. Pat. No. 6,470,795 (Methods and Apparatus for Vacuum/Gas Flush Treatment of Fresh Produce), U.S. Pat. No. 6,189,299 (Apparatus for Cooling and Packaging Bulk Fresh Products), and U.S. Pat. No. 6,532,717 (Method and Apparatus for Sealing a Flexible Bag to a Pallet), which are incorporated herein by reference. For instance, the packaging apparatus and methods described and illustrated in the '299 patent would be suitable for use in connection with the present invention, as would the bag Using the above procedure, wherein the entire produce compartment is first evacuated and then brought back to atmospheric pressure using a low-oxygen gas-air mixture before sealing the liner bags 55, prevents the damage to produce caused in prior systems wherein individual, collapsible bags are evacuated.

FIG. 4 is a flow chart illustrating one possible implementation of a method according to the invention. The method commences execution at box (or step) 400, and as indicated includes possible error conditions and error lights to give the user feedback as to the operation of the mixing system. The error lights (not separately shown) and other displays of conditions of the mixing system may be provided in a console, computer display or the like accessible by a user or controller of the system.

It will be appreciated that the first mode of operation, wherein the air valve is the master valve, are reflected at boxes 480 and 490, wherein the gas valve is adjusted. Similarly, the second mode of operation is reflected at boxes 470 and 500, wherein the gas valve is the master valve and the air valve is adjusted. The amounts by which the valves are opened (i.e. positions increased) or closed (positions decreased) may be predetermined increments, and may be different for each valve and for increases and decreases, or they may be made equal as a matter of the percentage the valve is opened or closed relative to its fully opened or closed position. Alternatively the increments may be selected based upon expected or empirically determined increases or decreases in flow rate. In the latter case, the increments may be different for different flow rates; e.g., for high flow rates a larger absolute expected flow change may be achieved by larger incremental adjustments of the valves than at lower flow rates.

Box 510 indicates that both valve positions may be increased as long as neither valve is at its widest open position. Thus, either mode of operation may be executed even though the master valve for that particular mode may not be fully open.

Modes of Operation for Multiple Components

Typically, either the air valve 180 or the gas valve 230 shown in FIG. 3 will be maintained fully open, depending upon the mode of operation. As indicated at boxes 470-480 and 510 of FIG. 4, if either valve is not fully open, the system will open both valves until at least one valve is at its widest open position. However, there may be embodiments where it is suitable to maintain the master valve at some partially closed position. This may particularly be the case in embodiments wherein more than two components are being mixed, e.g. several gases of different types. In such embodiments, it may be appropriate to open different valves to varying degrees to achieve a desired mixture, while maintaining the above-described ability to dynamically and automatically change among two or more modes of operation.

Thus, the present invention is applicable to systems for controlling any number of valves or other elements that govern an amount of liquid, gas, power, or other material or resource. The pipes, cables or the like that supply the resource may be connected in parallel to one another (extending the arrangement of FIG. 3), or may be connected in a more complex fashion, including a combination of series and parallel connections and various valve configurations.

The number of modes of operation possible will depend upon the number of valves being controlled. For instance, with three valves A, B and C (not illustrated), valve A may be the master valve, with valve B a secondary valve and valve C a tertiary valve. In this example, valve B will be a master valve relative to valve C but a slave valve relative to valve A. Another mode of operation for such a system may involve a valve hierarchy A→C→B (i.e. with the roles of valves B and C reversed relative to the preceding example). Thus, with three valves being controlled there will be six possible modes of operation (two for each situation with valve A, B or C being the overall master valve), and in general for n elements being controlled there will be n! (n-factorial) possible modes of operation (e.g. 24 modes of operation for four elements). In such embodiments, it may be that none of the valves (even the master valve) is maintained fully open during operation, depending on the total mass flow desired. The present invention can be applied to automatically control these modes of operation and to dynamically change modes as needed for the particular application.

Other variations and implementations of the present invention will be appreciated from the foregoing description.

What is claimed is:

1. A produce preservation system, including:
an air pipe configured to receive atmospheric air;
a first valve coupled to the air pipe and configured to allow varying rates of air flow therethrough;
a gas pipe configured to receive a gas;
a second valve coupled to the gas pipe and configured to allow varying rates of gas flow therethrough;
a vacuum vessel configured to hold produce and to receive a mixture of air and gas downstream of the first valve and the second valve;
a valve controller connected to the first valve and the second valve, and configured to adjust the first valve and the second valve in a first mode and a second mode;
wherein the first mode is configured to maintain the first valve in a wide-open position and to adjust the second valve to achieve a predetermined gas-air ratio, and the second mode is configured to maintain the second valve in a partially closed position and to adjust the first valve to achieve the predetermined gas-air ratio;
a mixing chamber that couples to the first valve and the second valve and includes a mixing-manifold configured to facilitate mixing of the air and the gas;
a gas-air mixture distribution-manifold configured to distribute the gas-air mixture to the vacuum vessel;
wherein the distribution-manifold includes a plurality of distribution pipes, each in communication with the mixing chamber and including an outlet in communication with the vacuum vessel.

2. The system of claim 1, wherein the gas includes nitrogen.

3. The system of claim 1, further including an oxygen sensor coupled to the vacuum vessel, configured to detect an amount of oxygen in the vacuum vessel.

4. The system of claim 3, wherein the valve controller is configured to receive a signal representing the detected amount of oxygen.

5. The system of claim 4, wherein the valve controller is configured to respond to the detected amount of oxygen by adjusting the second valve when in the first mode, and by adjusting the first valve when in the second mode, to achieve the predetermined gas-air ratio.

6. The system of claim 1, wherein the valve control logic first mode is configured to maintain the first valve as a master valve in a substantially fixed position and to adjust the positions of the second valve to achieve the predetermined ratio.

7. The system of claim 1, wherein the valve control logic second mode is configured to maintain the second valve as a master valve in a substantially fixed position and to adjust the positions of the first valve to achieve the predetermined ratio.

8. The system of claim 1, further including a component sensor configured to detect an amount of at least one predetermined component present in a mixture of the air and the gas in a region in communication with the mixing chamber.

9. The system of claim 8, wherein:
the component sensor is coupled to the valve control logic; and
the valve control logic is configured to adjust at least one of the first valve and the second valve based upon the amount of detected predetermined component in the mixture.

10. The system of claim 8, wherein the predetermined component includes oxygen.

11. The system of claim 1, wherein the valve control logic includes a programmable logic controller.

12. The system of claim 1, further including a muffler and an air-flow turbulence reduction mechanism on the air pipe.

13. The system of claim 1, further including a heat exchanger to warm up the gas in the gas pipe above its boiling temperature.

14. The system of claim 3, wherein the oxygen concentration inside the vacuum vessel is within the 7% to 9% range.

15. The system of claim 1, further including flow sensors mounted on said gas and said air pipes, said flow sensors transmitting signal to said valve controller.

* * * * *